United States Patent
Park et al.

(10) Patent No.: US 7,846,609 B2
(45) Date of Patent: Dec. 7, 2010

(54) MODULE-TYPE FUEL CELL SYSTEM

(75) Inventors: Jung-kurn Park, Suwon-si (KR);
Dong-hyun Kim, Suwon-si (KR);
Eun-suk Cho, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 282 days.

(21) Appl. No.: 11/946,491

(22) Filed: Nov. 28, 2007

(65) Prior Publication Data

US 2008/0131747 A1      Jun. 5, 2008

(30) Foreign Application Priority Data

Nov. 30, 2006    (KR) ...................... 10-2006-0120140

(51) Int. Cl.
*H01M 8/02*    (2006.01)
*H01M 8/04*    (2006.01)

(52) U.S. Cl. .................. 429/471; 429/460; 429/462; 429/469; 429/505; 429/507; 429/436; 429/515

(58) Field of Classification Search .................. 429/26, 429/12, 21, 34, 33, 30, 19
See application file for complete search history.

(56) References Cited

U.S. PATENT DOCUMENTS 4,330,654 A    5/1982   Ezzell et al.
(Continued)

FOREIGN PATENT DOCUMENTS

EP    1065380    3/2001
(Continued)

OTHER PUBLICATIONS

Machine translation of: JP 2006-073312, Yoshioka et al., Mar. 16, 2006.*
Machine translation of: JP 2005-332736, Murayama et al., Dec. 2, 2005.*
"Meeting the energy needs of future warriors", Committee on Soldier Power/Energy Systems board on Army Science and Technology, Division on Engineering and Physical Sciences, National Research Council, 2004, p. 82-83.*
Notice of Allowance from Corresponding Korean Patent Application 10-2007-0030973.
Office Action for corresponding Korean Application No. 10-2007-0204600.

(Continued)

*Primary Examiner*—Jonathan Crepeau
*Assistant Examiner*—Kenneth Douyette
(74) *Attorney, Agent, or Firm*—Knobbe, Martens, Olson & Bear, LLP (57) ABSTRACT

A module-type fuel cell system including a power module includes a generator installed inside and a power housing having a plurality of connection holes formed sideward, wherein the generator generates electricity through an oxidation-reduction reaction of an oxidizing agent with a hydrogen-containing fuel; a fuel supply module including a fuel supply unit installed inside and a power housing having a plurality of connection holes formed sideward, wherein the fuel supply unit supplies a hydrogen-containing fuel to the generator; an oxidizing agent supply module including an oxidizing agent supply unit installed inside and an oxidizing agent supply housing having connection holes formed sideward, wherein the oxidizing agent supply unit supplies an oxidizing agent to the generator; and a recovery module including a storage space formed therein and a recovery housing having a plurality of connection holes formed sideward, wherein the storage space recovers an unreacted fuel generated in the generator, wherein the power module is closely attached and assembled in one side of the recovery module in a surface-to-surface contact manner, and the fuel supply module and the oxidizing agent supply module are closely attached and assembled in the other side of the recovery module in a surface-to-surface contact manner.

34 Claims, 3 Drawing Sheets

U.S. PATENT DOCUMENTS

| | | | |
|---|---|---|---|
| 4,358,545 A | 11/1982 | Ezzell et al. | |
| 4,417,969 A | 11/1983 | Ezzell et al. | |
| 4,433,082 A | 2/1984 | Grot | |
| 4,610,762 A | 9/1986 | Birdwell | |
| 4,818,640 A | 4/1989 | Fukuda et al. | |
| 4,839,246 A | 6/1989 | Takabayashi | |
| 4,940,525 A | 7/1990 | Ezzell et al. | |
| 5,094,995 A | 3/1992 | Butt et al. | |
| 5,229,222 A * | 7/1993 | Tsutsumi et al. | 429/19 |
| 6,050,779 A | 4/2000 | Nagao et al. | |
| 6,254,748 B1 | 7/2001 | Surampudi et al. | |
| 6,268,077 B1 * | 7/2001 | Kelley et al. | 429/33 |
| 6,410,180 B1 | 6/2002 | Cisar et al. | |
| 6,562,446 B1 | 5/2003 | Totsuka | |
| 6,916,573 B2 | 7/2005 | Trabold et al. | |
| 7,045,230 B2 | 5/2006 | Rusta-Sellehy et al. | |
| 2003/0165720 A1 | 9/2003 | DeFilippis | |
| 2003/0215680 A1 * | 11/2003 | Lillis et al. | 429/21 |
| 2004/0197638 A1 | 10/2004 | McElrath et al. | |
| 2005/0069735 A1 | 3/2005 | George, II et al. | |
| 2005/0287402 A1 | 12/2005 | Maly et al. | |
| 2006/0269829 A1 | 11/2006 | Choi et al. | |
| 2006/0272943 A1 | 12/2006 | Chein et al. | |
| 2006/0280994 A1 | 12/2006 | Kim et al. | |
| 2006/0286425 A1 | 12/2006 | Nakato et al. | |
| 2007/0015014 A1 | 1/2007 | Kurosaki et al. | |
| 2007/0047929 A1 | 3/2007 | Hsieh | |
| 2007/0178343 A1 | 8/2007 | Muramatsu | |
| 2008/0063915 A1 | 3/2008 | Yamamoto | |
| 2008/0171240 A1 | 7/2008 | Ju et al. | |
| 2008/0199741 A1 | 8/2008 | Shin et al. | |
| 2008/0199758 A1 | 8/2008 | Shin et al. | |
| 2008/0241634 A1 | 10/2008 | An et al. | |
| 2009/0104489 A1 | 4/2009 | Shin et al. | |

FOREIGN PATENT DOCUMENTS

| | | |
|---|---|---|
| EP | 1239530 | 9/2002 |
| JP | 07-027056 | 1/1995 |
| JP | 07-182001 | 7/1995 |
| JP | 08-200216 | 8/1996 |
| JP | 10-284103 | 10/1998 |
| JP | 11-204121 | 7/1999 |
| JP | 2002-339872 | 11/2002 |
| JP | 2004-127671 | 4/2004 |
| JP | 2004-134326 | 4/2004 |
| JP | 2004-158355 | 6/2004 |
| JP | 2004-342480 | 12/2004 |
| JP | 2004-354210 | 12/2004 |
| JP | 2005-093143 | 4/2005 |
| JP | 2005-108850 | 4/2005 |
| JP | 2005-116333 | 4/2005 |
| JP | 2005-241507 | 9/2005 |
| JP | 2005-243618 | 9/2005 |
| JP | 2005-276602 | 10/2005 |
| JP | 2005-276697 | 10/2005 |
| JP | 2005-317437 | 11/2005 |
| JP | 2005332736 A | 12/2005 |
| JP | 2006-019106 | 1/2006 |
| JP | 2006-032135 | 2/2006 |
| JP | 2006-073235 | 3/2006 |
| JP | 2006073312 A | 3/2006 |
| JP | 2006-156295 | 6/2006 |
| JP | 2006-260966 | 9/2006 |
| JP | 2006-286321 | 10/2006 |
| JP | 2007141457 A | 6/2007 |
| KR | 930004841 | 6/1993 |
| KR | 10-0157488 | 7/1998 |
| KR | 10-2002-0074046 | 9/2002 |
| KR | 10-2003-0083511 | 10/2003 |
| KR | 10-2004-0017477 | 2/2004 |
| KR | 10-2004-0043499 | 5/2004 |
| KR | 10-2004-0092024 | 11/2004 |
| KR | 10-2005-0122769 A | 12/2005 |
| KR | 10-2006-0017599 | 2/2006 |
| KR | 10-2006-0018577 | 3/2006 |
| KR | 10-2006-0041912 | 5/2006 |
| KR | 10-2006-0083002 | 7/2006 |
| KR | 10-2006-0106284 | 10/2006 |
| KR | 10-2007-0042736 | 4/2007 |
| KR | 1020070075712 A | 7/2007 |
| KR | 10-2007-0095686 | 10/2007 |
| KR | 10-0776504 | 11/2007 |
| WO | WO03090334 A2 | 10/2003 |
| WO | WO 2005106994 | 11/2005 |
| WO | WO 2006027667 | 3/2006 |

OTHER PUBLICATIONS

European Search Report from corresponding EP Application 08101591.9 1227/1962363, Jun. 12, 2009.

U.S. Appl. No. 12/040,817, filed Feb. 29, 2008, Jin-hong An, 2008-0241634, Office Action of May 4, 2010, Final Office Action of Jan. 19, 2010 and response, Office Action of Jul. 9, 2009 and response, Restriction Requirement of Apr. 1, 2009 and response.

U.S. Appl. No. 11/956,180, filed Dec. 13, 2007, Shin et al., 2008-0199758, Final Office Action of Dec. 30, 2010 and response, Office Action of May 19, 2009 and response.

U.S. Appl. No. 12/013,298, filed Jan. 11, 2008, Ju et al., 2008-0171240, Jul. 2008.

U.S. Appl. No. 12/020,302, filed Jan. 25, 2008, Shin et al., 2008-0199741, Aug. 2008.

U.S. Appl. No. 12/134,903, filed Jun. 6, 2008, Shin et al., 2009-0104489, Apr. 2009.

* cited by examiner

FIG. 4

MODULE-TYPE FUEL CELL SYSTEM

CROSS-REFERENCE TO RELATED APPLICATION

This application claims priority to and the benefit of Korean Patent Application No. 10-2006-120140, filed on Nov. 30, 2006, in the Korean Intellectual Property Office, the entirety of which is incorporated herein by reference.

BACKGROUND

1. Technical Field

The present disclosure relates to a fuel cell system capable of generating electricity through an electrochemical reaction between oxygen and hydrogen, and more particularly to a module-type fuel cell system in which previously preparing modules are assembled in a housing structure.

2. Discussion of Related Art

Generally, a fuel cell system is a system for generating electricity through an electrochemical reaction between an oxidizing agent and a fuel such as hydrogen. Such a fuel cell system includes an electric generator for generating electricity; a fuel supply unit for supplying a hydrogen-containing fuel to the electric generator; and an oxidizing agent supply unit for supplying an oxidizing agent to the electric generator. The fuel supply unit and the oxidizing agent supply unit are each equipped with a suitable pump. The above-mentioned components are fluidly connected, for example, through connecting pipes and the like, which enable fluid flow therethrough.

Also, the fuel cell system may have additional components, such as an unreacted fuel recovery unit for recovering and re-using unreacted fuel and vapor-phase water discharged from the electric generator; and/or a heat exchange unit.

If the components are connected together using pipes, then the pipes take up space between the components, thereby increasing dead space inside the fuel cell system.

Also, routing interconnecting pipes without interference therebetween reduces manufacturing efficiency.

SUMMARY OF THE INVENTION

Accordingly, an object is to provide a module-type fuel cell system that reduces dead space and simplifies manufacturing a finished product by preassembling a plurality of component modules, each comprising one or more fuel cell system components, and simply assembling the component modules.

Another object is to provide a module-type fuel cell system in which the fluid-flow connections are made through an assembly process of modules, instead of by connecting the components using connecting.

One embodiment provides a module-type fuel cell system including: a power module including a power module including a generator installed inside and a power housing having a plurality of connection holes formed sideward, wherein the generator generates electricity through an oxidation-reduction reaction of an oxidizing agent with a hydrogen-containing fuel and the connection holes are connected to the generator to enable fluid flow; a fuel supply module including a fuel supply unit installed inside and a power housing having a plurality of connection holes formed sideward, wherein the fuel supply unit supplies a hydrogen-containing fuel to the generator and the connection holes are connected to the fuel supply unit to enable fluid flow; an oxidizing agent supply module including an oxidizing agent supply unit installed inside and an oxidizing agent supply housing having connection holes formed sideward, wherein the oxidizing agent supply unit supplies an oxidizing agent to the generator and the connection holes are connected the oxidizing agent supply unit to enable fluid flow; and a recovery module including a storage space formed therein and a recovery housing having a plurality of connection holes formed sideward, wherein the storage space recovers an unreacted fuel generated in the generator and the connection holes are connected to the storage space to enable fluid flow, wherein the power module is closely attached and assembled in one side of the recovery module in a surface-to-surface contact manner, and the fuel supply module and the oxidizing agent supply module are closely attached and assembled in the other side of the recovery module in a surface-to-surface contact manner.

A fuel supply line for supplying the hydrogen-containing fuel from the fuel supply module to the power module is formed by assembling the fuel supply module, the recovery module and the power module.

An unreacted fuel outlet is provided in one side of the power module, and an unreacted fuel inlet corresponding to the unreacted fuel outlet is provided in one side of the recovery module.

A fuel inlet is provided in one side of the fuel supply module, a fuel outlet is provided in the other side of the fuel supply module, and a fuel pump is installed inside, the fuel pump connecting the fuel outlet with the fuel inlet to enable fluid flow.

An oxidizing agent flow tube is further provided in the recovery module, the oxidizing agent flow tube connecting the power module with the oxidizing agent supply module so that an oxidizing agent can flow through the oxidizing agent flow tube. Then, an oxidizing agent supply line for supplying the oxidizing agent from the oxidizing agent supply module to the power module is formed by assembling the oxidizing agent supply module, the recovery module and the power module.

The recovery module further includes a heat exchange module for condensing vapor discharged from the power module, and a vapor flow tube is further provided in the recovery module, the vapor flow tube connecting the heat exchange module with the power module so that the vapor can flow through the vapor flow tube. Then, a vapor supply line for supplying the vapor from the power module to the heat exchange module is formed by assembling the power module, the recovery module and the heat exchange module.

A water outlet for discharging water generated through the condensation of vapor is provided in one side of the heat exchange module, and a water inlet corresponding to the water outlet is provided in the other side of the recovery module.

A protrusion is provided in each of the connection holes of the housing constituting one module of the adjacent modules, and a groove for connecting to the protrusion is provided in each of the connection holes of the housing constituting another module of the adjacent modules.

Some embodiments provide a module-type fuel cell system comprising: a power module comprising a power housing, a generator installed therein, and a plurality of connection ports formed on a first side of the power housing and fluidly connected to the generator, wherein the generator is operable to generate electricity through an oxidation-reduction reaction between an oxidizing agent and a hydrogen-containing fuel; a fuel supply module comprising a fuel supply housing, a fuel supply unit installed therein, and a plurality of connection ports formed on a first side of the fuel supply housing and fluidly connected to the fuel supply unit, wherein the fuel supply unit is configured to supply a suitable hydrogen-containing fuel to the generator; an oxidizing agent supply module comprising an oxidizing agent supply housing, an oxidizing agent supply unit installed therein, and a connection port formed on a side of the oxidizing agent supply housing and fluidly connected to the oxidizing agent supply unit, wherein the oxidizing agent supply unit is configured to supply an oxidizing agent to the generator; and a recovery module comprising a recovery housing comprising at a first side and a second side, a storage space formed therein, and a plurality of connection ports on the first and second sides of the recovery housing and fluidly connected to the storage space, wherein the storage space is configured to recover unreacted fuel from the generator. The first side of the power housing contacts and is secured to the first side of the recovery housing, and the side of the fuel supply housing and the side of the oxidizing agent supply housing contact and are secured to the second side of the recovery module, and corresponding connection ports of adjacent modules align and form fluid connections therebetween.

Some embodiments further comprise a heat exchange module comprising a heat exchange housing, a heat exchange unit therein, and a plurality of connection ports formed on a side of the heat exchange housing and fluidly connected to the heat exchange unit, wherein the heat exchange unit is operable to condense water vapor discharged from the power module. In some embodiments, the side of the heat exchange module contacts and is secured to the second side of the recovery module.

Some embodiments further comprise a fuel storage module comprising a fuel storage housing configured for storing a hydrogen-containing fuel therein, and a connection port formed on a side of the fuel storage housing fluidly connected to a corresponding connection port on a side of the fuel supply module. In some embodiments, the side of the fuel storage housing contacts and is secured to a side of the fuel supply housing.

In some embodiments, the corresponding connection ports of adjacent modules are hermetically connected. In some embodiments, a coupling is provided on each the connection port of the housing of a first module, and a socket dimensioned for connecting to the coupling is provided in each the connection port of the housing of a second, adjacent module. In some embodiments, the couplings and the sockets are shrink fit connectors and are coupled together. In some embodiments, the couplings and the sockets are integrally formed on each of the corresponding connection ports.

In some embodiments, a shrink fit coupling is provided on the housing of a first module, and a fit socket corresponding to the shrink fit coupling is provided on the housing of a second, adjacent module. In some embodiments, the shrink fit coupling is coupled to the fit socket, thereby maintaining contact between the adjacent modules.

Some embodiments further comprise a fuel flow tube installed within and traversing the storage space of the recovery housing, the fuel flow tube fluidly connecting the fuel supply module with the power module. In some embodiments, the assembled fuel supply module, recovery module, and power module form a fuel supply line comprising the fuel flow tube, a connection port of the fuel supply module, and a connection port of the power module, wherein the fuel supply line fluidly connects the fuel supply module to the power module.

In some embodiments, a connection port on the power housing of the power module is an unreacted fuel outlet configured for discharging unreacted fuel from the generator, and a corresponding connection port on the recovery housing of the recovery module is an unreacted fuel inlet.

In some embodiments, a first connection port formed on a second side of the fuel supply housing of the fuel supply module is a fuel inlet configured for allowing inflow of a hydrogen-containing fuel, and a second connection port formed on the first side of the fuel supply housing is a fuel outlet corresponds to the fuel inlet of the recovery housing, the fuel outlet is configured for discharging a hydrogen-containing fuel, and the fuel supply housing comprises a fuel pump installed therein, fluidly connecting the fuel outlet with the fuel inlet.

Some embodiments further comprise an oxidizing agent flow tube installed within and traversing the storage space of the recovery housing, the oxidizing agent flow tube fluidly connecting the power module with the oxidizing agent supply module. In some embodiments, the assembled oxidizing agent supply module, recovery module, and power module form an oxidizing agent supply line comprising the oxidizing agent flow tube, a connection port of the oxidizing agent supply module, and a connection port of the power module, wherein the oxidizing agent supply line fluidly connects the oxidizing agent supply module to the power module.

Some embodiments further comprise a vapor flow tube installed within and traversing the storage space of the recovery module, fluidly connecting the heat exchange module with the power module. In some embodiments, the assembled power module, recovery module, and heat exchange module form a vapor supply line comprising the vapor flow tube, a connection port of the power module, and a connection port of the heat exchange module, wherein the vapor supply line fluidly connects the power module to the heat exchange module.

In some embodiments, a connection port on a side of the heat exchange housing is a water outlet for water condensed in the heat exchange unit, and corresponding connection port on the second side of the recovery housing is a water inlet.

In some embodiments, a connection port on the second side of the recovery housing is an unreacted fuel outlet for unreacted fuel, and a corresponding connection port on the first side of the fuel supply housing is an unreacted fuel inlet. In some embodiments, the fuel supply module further comprises a mixing tank fluidly connected to the unreacted fuel inlet and the fuel inlet installed therein, configured for mixing an unreacted fuel from the unreacted fuel inlet with a hydrogen-containing fuel from the fuel inlet. In some embodiments, the fuel supply unit further comprises an inlet fuel pump fluidly connected to the mixing tank and an outlet pump fluidly connected to the mixing tank.

In some embodiments, a gas-liquid separator is provided at the top of the recovery module. In some embodiments, a gas-liquid separator is provided at the top of the heat exchange module.

In some embodiments, the fuel flow tube in the recovery module fluidly connects a fuel inlet connection port and a fuel outlet connection port. In some embodiments, a connection port in the power housing is a fuel inlet corresponding to the fuel outlet of the recovery housing. In some embodiments, the fuel inlet of the power housing is fluidly connected to an anode electrode of the generator.

In some embodiments, the connection port on the fuel storage housing is a fuel outlet corresponding to the fuel inlet of the fuel supply housing.

In some embodiments, the oxidizing agent flow tube in the recovery module fluidly connects an oxidizing agent inlet connection port and an oxidizing agent outlet connection port. In some embodiments, a connection port on the power housing is an oxidizing agent inlet corresponding to the oxidizing agent outlet of the recovery housing. In some embodiments, the oxidizing agent inlet of the power housing is fluidly connected to a cathode electrode of the generator.

In some embodiments, the connection port of the oxidizing agent supply housing is an oxidizing agent outlet corresponding to the oxidizing agent inlet of the recovery housing.

In some embodiments, the vapor flow tube of the recovery module fluidly connects a vapor inlet connection port and a vapor outlet connection port. In some embodiments, a connection port on the power housing is a vapor outlet corresponding to the vapor inlet of the recovery module, and a connection port on the heat exchange housing is a vapor inlet corresponding to the vapor outlet of the recovery module.

BRIEF DESCRIPTION OF THE DRAWINGS

These and/or other aspects and advantages will become apparent and more readily appreciated from the following description of the preferred embodiments, taken in conjunction with the accompanying drawings.

DETAILED DESCRIPTION OF CERTAIN EXEMPLARY EMBODIMENTS

Hereinafter, preferable embodiments will be described with reference to the accompanying drawings. Here, when a first element is described as coupled or connected to a second element, the first element may be directly coupled or connected to the second element, but may also be indirectly coupled or connected to the second element through one or more third elements. Furthermore, non-essential elements are omitted for clarity. Also, like reference numerals refer to like elements throughout. As shown in the drawings, modules are illustrated as generally rectangular, and adjacent modules are illustrated as having substantial surface-to-surface contact when assembled. Those skilled in the art will understand that other configurations and/or arrangements are used in other embodiments, however.

Figure 1:
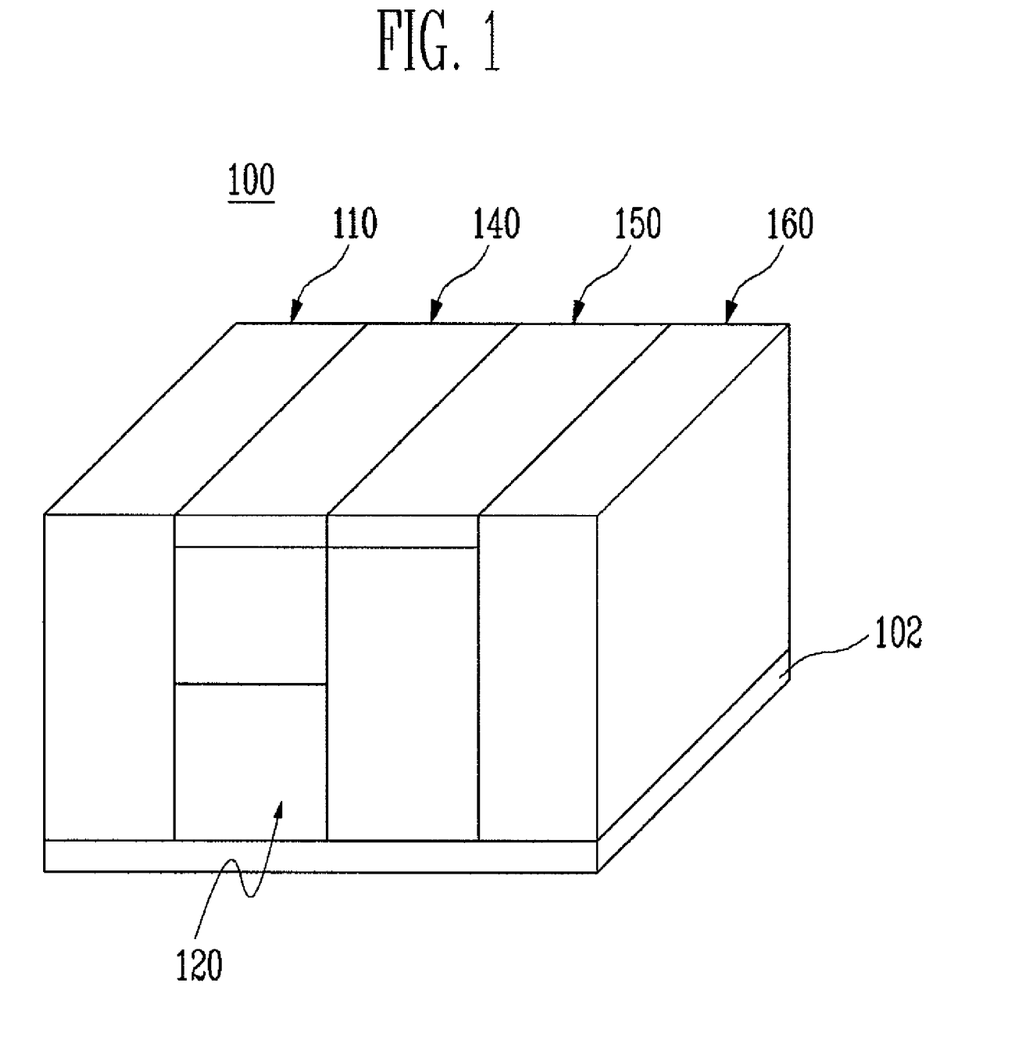
FIG. 1 is a perspective view showing an embodiment of a module-type fuel cell system.
Figure 2:
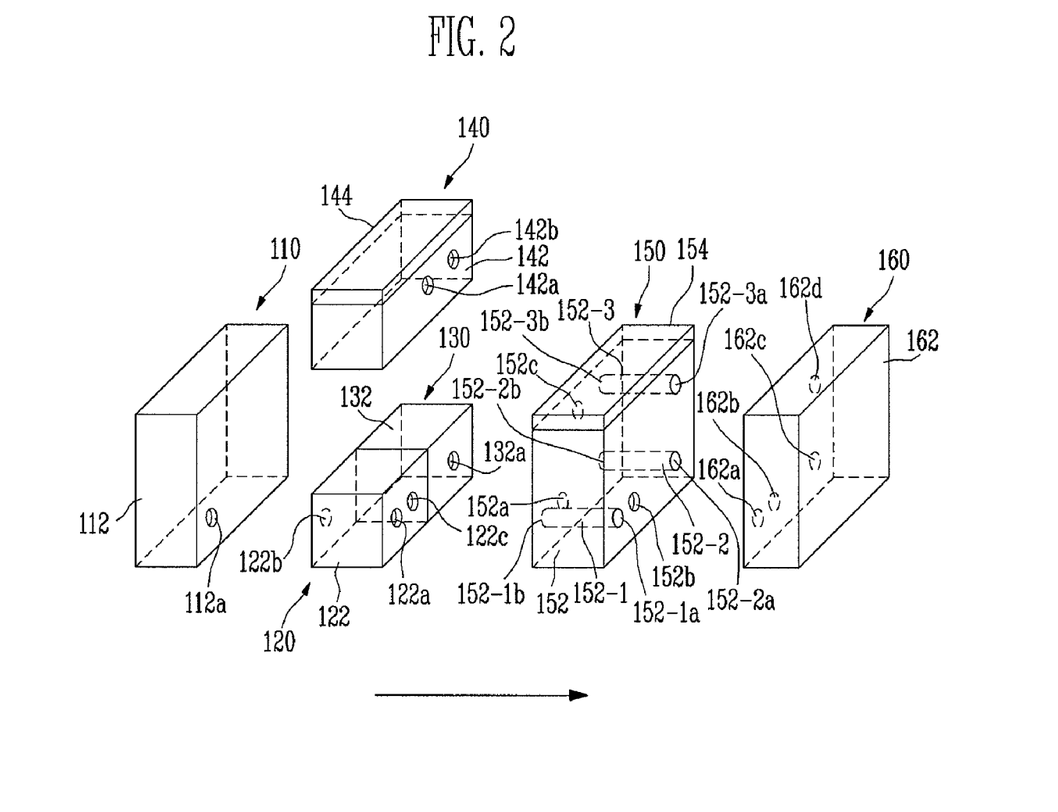
FIG. 2 is an exploded view of the module-type fuel cell system illustrated in FIG. 1.

FIG. 1 is perspective view showing of an embodiment of a module-type fuel cell system in assembled form, and FIG. 2 is an exploded perspective view showing the fuel supply modules of the module-type fuel cell system illustrated in FIG. 1.

Referring to FIG. 1, the module-type fuel cell system includes a power module 160 having a generator (not shown) installed therein, the generator configured for generating electricity through an oxidation-reduction reaction between an oxidizing agent and a hydrogen-containing fuel; a fuel supply module 120 having a fuel supply unit installed therein, the fuel supply unit configured for supplying a hydrogen-containing fuel to the generator within the power module 160; an oxidizing agent supply module 130 having an oxidizing agent supply unit installed therein, the oxidizing agent supply unit configured for supplying an oxidizing agent to the generator of the power module 160; and a recovery module 150 having a recovery unit installed therein, the recovery unit recovering an unreacted fuel inform the power module 160.

The generator installed inside the power module 160 comprises a suitable unit cell having a polymer membrane having selective ion permeability; and a membrane electrode assembly (MEA) comprising an anode electrode and a cathode electrode provided on each of the polymer membrane. A description of the oxidation-reduction reaction between an oxidizing agent and hydrogen in a fuel cell generator and the generation of electricity therefrom is omitted herein.

Referring to FIG. 2, the power module 160 has a power housing 162 having the generator installed therein, and a plurality of connection ports. For example, four connection ports are formed in the power housing 162 in the illustrated embodiment. The connection ports may be formed in a second side of the power housing 162. In the illustrated embodiment, the connection ports have the following functions: a fuel inlet 162a for allowing inflow of a hydrogen-containing fuel; an unreacted fuel outlet 162b for discharging an unreacted fuel; an oxidizing agent inlet 162c for allowing inflow of an oxidizing agent; and a vapor outlet 162d for discharging vapor, respectively. The connection holes are connected to the generator installed inside the power housing 162 to enable fluid flow to and from the generator. As a result, the hydrogen-containing fuel flowing in through the fuel inlet 162a is directly supplied to the anode electrode, and the oxidizing agent flowing in through the oxidizing agent inlet 162c is directly supplied to the cathode electrode. The power housing 162 may have a generally rectangular configuration, thereby facilitating an assembly process for manufacturing a finished fuel cell system.

The fuel supply module 120 of the module-type fuel cell system has a fuel supply housing 122 having a fuel supply unit installed therein, with the fuel supply unit configured for supplying a hydrogen-containing fuel. The fuel supply unit may comprise at least one fuel pump. A plurality of connection ports, for example, three connection ports in the illustrated embodiment, is formed in the fuel supply housing 122. The connection ports include a fuel outlet 122a for discharging a hydrogen-containing fuel to the power module 160; a fuel inlet 122b for allowing inflow of a hydrogen-containing fuel; and an unreacted fuel inlet 122c for allowing inflow of an unreacted fuel discharged from the generator of the power module 160. The fuel inlet 122b is provided on a second side of the fuel supply housing 122, and the fuel outlet 122a and the unreacted fuel inlet 122c are provided on a first side of the fuel supply housing 122 opposite from the second side. The fuel outlet 122a and the unreacted fuel inlet 122c of the fuel supply housing 122 are fluidly connected, respectively, to the fuel inlet 162a and the unreacted fuel outlet 162b of the power housing 162 through the recovery module 150, as described below.

The recovery module 150 is interposed between the fuel supply module 120 and the power module 160, with a storage space for unreacted fuel recovered from the generator disposed within a rectangular recovery housing 152. A plurality of connection ports, for example, nine connection ports in the illustrated embodiment, are formed on opposing first and second sides of the recovery housing 152. The connection ports of the recovery housing 152 include a fuel inlet 152-1b and a fuel outlet 152-1a fluidly connected to each other by a fuel flow tube 152-1; an oxidizing agent inlet 152-2b and an oxidizing agent outlet 152-2a fluidly connected to each other by an oxidizing agent flow tube 152-2; a vapor inlet 152-3a and a vapor outlet 152-3b fluidly connected to each other by a vapor flow tube 152-3; an unreacted fuel inlet 152b for allowing inflow of an unreacted fuel, discharged from the generator, into the storage space; an unreacted fuel outlet 152a for discharging an unreacted fuel from the storage space to the fuel supply unit 120; and a water inlet 152c for allowing inflow of water generated from a heat exchange module 140, as described below.

The fuel outlet 152-1a, the unreacted fuel inlet 152b, the oxidizing agent outlet 152-2a and the vapor inlet 152-3a are provided on the first side of the recovery housing 152, while the fuel inlet 152-1b, the unreacted fuel outlet 152a, the oxidizing agent inlet 152-2b, the vapor outlet 152-3b and the water inlet 152c are provided on the second side of the recovery housing 152. The fuel flow tube 152-1, the oxidizing agent flow tube 152-2 and the vapor flow tube 152-3 are disposed in and traverse the storage space.

The fuel outlet 152-1a, the unreacted fuel inlet 152b, the oxidizing agent outlet 152-2a and the vapor inlet 152-3a provided on the first side of the recovery housing 152 correspond to the fuel inlet 162a, the unreacted fuel outlet 162b, the oxidizing agent inlet 162c and the vapor outlet 162d of the power housing 162, respectively. Also, the fuel inlet 152-1b, the unreacted fuel outlet 152a, the oxidizing agent inlet 152-2b, the vapor outlet 152-3b and the water inlet 152c provided on the second side of the recovery housing 152 correspond, respectively, to the fuel outlet 122a and the unreacted fuel inlet 122c of the fuel supply housing 122, described above, an oxidizing agent outlet 132a of an oxidizing agent supply housing 132, and a vapor inlet 142b and a water outlet 142a of a heat exchange housing 142, described below.

The oxidizing agent supply module 130 has a rectangular oxidizing agent supply housing 132 having an oxidizing agent supply unit installed therein, with the oxidizing agent supply unit configured to supplying an oxidizing agent. The oxidizing agent supply unit may comprise at least one air pump. Connection ports include an oxidizing agent outlet 132a, formed on a first side of the oxidizing agent supply housing 132. The oxidizing agent supply housing 132 may be arranged in parallel with the fuel supply housing 122 on a flat surface, for example, a base 102 (FIG. 1) as, but is not limited thereto.

In the embodiment shown in FIG. 1 and FIG. 2, the second side of the power housing 162 of the power module 160 is adjacent to and contacts the first side of the recovery module housing 152, and the first side of the fuel supply housing 122 of the fuel supply module 120 and the first side of the oxidizing agent supply housing 132 of the oxidizing agent supply module 130 are adjacent to and contact the second side of the recovery module 150. In the illustrated arrangement, the corresponding connection ports between adjacent modules are aligned and hermetically connected to each other.

Accordingly, the fuel outlet 122a of the fuel supply housing 122 is fluidly connected to the fuel inlet 162a of the power housing 162 through the fuel inlet 152-1b, the fuel flow tube 152-1 and the fuel outlet 152-1b of the recovery housing 152. The unreacted fuel inlet 122c is fluidly connected to the unreacted fuel outlet 162b of the power housing 162 through the unreacted fuel inlet 152b and the unreacted fuel outlet 152a of the recovery housing 152. Also, the oxidizing agent outlet 132a of the oxidizing agent supply housing 132 is fluidly connected to the oxidizing agent inlet 162c of the power housing 162 through the oxidizing agent inlet 152-2b, the oxidizing agent flow tube 152-2 and the oxidizing agent outlet 152-2a of the recovery housing 152.

In the power housing 162, the hydrogen-containing fuel is supplied to the anode electrode through the fuel inlet 162a. Similarly, the oxidant is supplied to the cathode through the oxidizing agent inlet 162c.

A portion of the hydrogen-containing fuel supplied to the anode electrode does not react, and is discharged as an unreacted fuel through the unreacted fuel outlet 162b.

The unreacted fuel inlet 152b corresponding to the unreacted fuel outlet 162b is provided on the first side of the recovery housing 152. Accordingly, unreacted fuel, discharged from the anode electrode of the generator through the unreacted fuel outlet 162b of the power housing 162, flows through the unreacted fuel inlet 152b of the recovery housing 152 into the storage space.

The unreacted fuel outlet 152a for discharging unreacted fuel stored in the storage space is provided on the second side of the recovery housing 152, and an unreacted fuel inlet 122c corresponding to the unreacted fuel outlet 152a is provided on the first side of the fuel supply housing 122.

Figure 3:
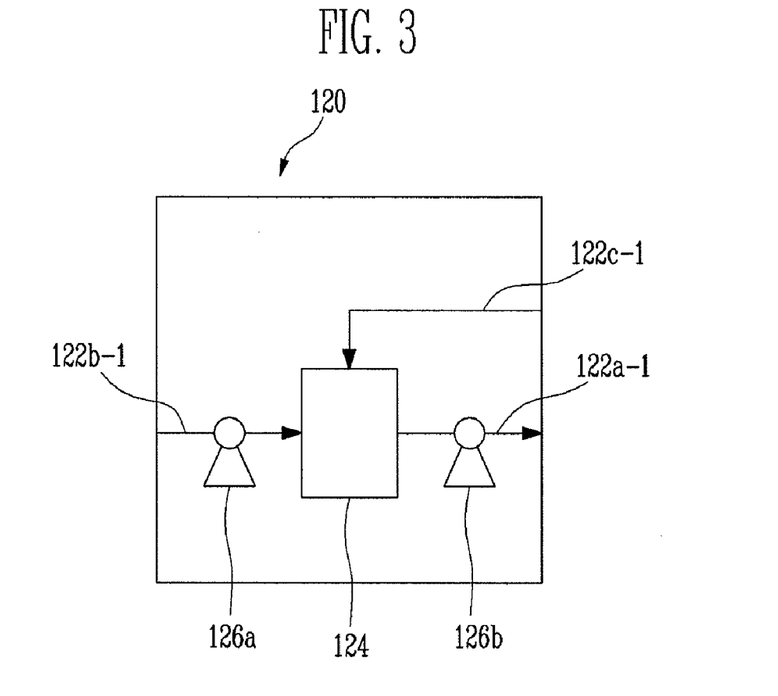
FIG. 3 schematically illustrates an embodiment of a fuel supply module.

Referring to FIG. 3, in the fuel supply housing 122 is disposed a mixing tank 124 for mixing a hydrogen-containing fuel with an unreacted fuel. An unreacted fuel flow channel 122c-1 fluidly connects unreacted fuel inlet 122c with the mixing tank 124. Accordingly, unreacted fuel discharged through the unreacted fuel outlet 152a of the recovery housing 152 flows through the unreacted fuel inlet 122c of the fuel supply housing 122, and into the mixing tank 124 through the unreacted fuel flow channel 122c-1.

Returning to FIG. 2, the module-type fuel cell system further includes a fuel storage module 110 including a fuel storage housing 112 configured for storing a hydrogen-containing fuel. The fuel storage housing 112 has a generally rectangular shape, and has a connection port formed on a first side thereof, including a fuel outlet 112a for discharging a stored hydrogen-containing fuel. The fuel inlet 122b disposed on the second side of the fuel supply housing 122 corresponds to the fuel outlet 112a.

Returning to FIG. 3, the fuel inlet 122b is fluidly connected to the mixing tank 124 through a fuel flow channel 122b-1. Accordingly, a hydrogen-containing fuel, discharged through the fuel outlet 112a of the fuel storage housing 112, flows in the mixing tank 124 through the fuel flow channel 122b-1.

In the mixing tank 124, a hydrogen-containing fuel is mixed with an unreacted fuel flowing in through the unreacted fuel flow channel 122c-1, to provide a hydrogen-containing fuel with a predetermined concentration. This hydrogen-containing fuel flows through a fuel flow channel 122a-1, and is discharged from the fuel supply housing 122 through the fuel outlet 122a.

Fuel pumps 126a, 126b are arranged, respectively, in the fuel flow channel 122b-1 and the fuel flow channel 122a-1 flanking the mixing tank 124. A hydrogen-containing fuel is pumped into the mixing tank 124 from the fuel storage housing 112 through the fuel flow channel 122b-1 by the first fuel pump 126a, and a hydrogen-containing fuel is pumped out toward the anode electrode from the mixing tank 124 through the fuel flow channel 122a-1 by the second fuel pump 126b.

Accordingly, the hydrogen-containing fuel pumped through the fuel outlet 122a by the second fuel pump 126b flows to the anode electrode of the generator in the power module 160 through the fuel flow tube 152-1 of the recovery module 150. And, the oxidizing agent flows to the cathode electrode of the generator in the power module 160 from the oxidizing agent supply module 130 through the oxidizing agent flow tube 152-2. Electricity is generated in an oxidation-reduction reaction at the anode electrode and the cathode electrode, and water vapor is generated as a by-product at the cathode electrode. As described above, a vapor outlet 162d for discharging vapor is provided in the power module 160.

The module-type fuel cell system further includes a heat exchange module 140 for reusing the water vapor. The heat exchange module 140 includes a generally rectangular heat exchange housing 142 having a heat exchanger (not shown) installed therein. A vapor inlet 142b configured for allowing inflow of water vapor discharged from the power module 160 is provided on a first side of the heat exchange housing 142. A water outlet 142a for discharging liquid water is provided on the first side the heat exchange housing 142, the liquid water being formed by flowing the water vapor into the heat exchanger through the vapor inlet 142b, followed by condensing the vapor in the heat exchanger. A water inlet 152c corresponding to the water outlet 142a is provided on the recovery module 150 to recover the water discharged through the water outlet 142a. Accordingly, the water, which is generated from water vapor formed at the cathode electrode of the generator passing through the heat exchange module 140, is recovered into the storage space of the recovery housing 152 through the water inlet 152c, and may be reused, for example, by mixing the water with an unreacted fuel in the storage space.

In the illustrated embodiment, the recovery module 150 is arranged between the heat exchange module 140 and the power module 160, thereby simplifying the configuration of the fuel cell system. As described above, a vapor flow tube 152-3 is disposed in the storage space of the recovery housing 152, terminating in a vapor inlet 152-3a and a vapor outlet 152-3b formed in the recovery housing 152. The vapor inlet 152-3a corresponds to the vapor outlet 162d of the power housing 162, and the vapor outlet 152-3b corresponds to the vapor inlet 142b of the heat exchange housing 142. As a result, the water vapor generated at the cathode electrode flows in the heat exchanger of the heat exchange module 140 through the vapor flow tube 152-3.

Hereinafter, an assembly process of the module-type fuel cell system is described in detail. The power module 160 comprising a generator is on one side, for example, a right side, of a base 102 (FIG. 1) using any suitable connection member (not shown) such as a bolt. The generator comprises a unit cell having a polymer membrane having selective ion permeability; and a membrane electrode assembly (MEA) comprising an anode electrode and a cathode electrode provided on each side of the polymer membrane. Then, a recovery module 150 is attached to the power module 160 in a surface-to-surface contact manner, for example, from the direction of the arrow in FIG. 2. The fuel outlet 152-1a, unreacted fuel inlet 152b, oxidizing agent outlet 152-2a, and vapor inlet 152-3a formed on the first side of the recovery housing 152 of the recovery module 150 are fluidly connected to the fuel inlet 162a, the unreacted fuel outlet 162b, the oxidizing agent inlet 162c, and the vapor outlet 162d, respectively, formed on the second side of the power module 160.

Then, the fuel supply module 120 and the oxidizing agent supply module 130 arranged in parallel with each other are attached to the second side of the recovery module 150 in a surface-to-surface contact manner. The heat exchange module 140 is also attached to the second side of the recovery module 150 in a surface-to-surface contact manner, and on top of the fuel supply module 120 and the oxidizing agent supply module 130. At this time, the fuel outlet 122a and the unreacted fuel inlet 122c of the fuel supply housing 122 are fluidly connected to the fuel inlet 152-1b and the unreacted fuel outlet 152a of the recovery housing 152, respectively. The oxidizing agent outlet 132a of the oxidizing agent supply housing 132 is fluidly connected to the oxidizing agent inlet 152-2b of the recovery housing 152. Similarly, the water outlet 142a and the vapor inlet 142b of the heat exchange housing 142 are fluidly connected to the water inlet 152c and the vapor outlet 152-3b of the recovery housing 152, respectively.

And, the fuel storage module 110 is attached to the second side of the fuel supply module 120 in a surface-to-surface contact manner. At this time, the fuel outlet 112a of the fuel storage housing 112 is fluidly connected to the fuel inlet 122b of the fuel supply housing 122.

As described above, connection ports formed in each of the modules are fluidly connected to corresponding connection ports formed in adjacent modules in a procedure of attaching adjacent modules to each other. In some embodiments, at least some of the fluid connections between the corresponding connection ports are hermetic or airtight connections.

Figure 4:
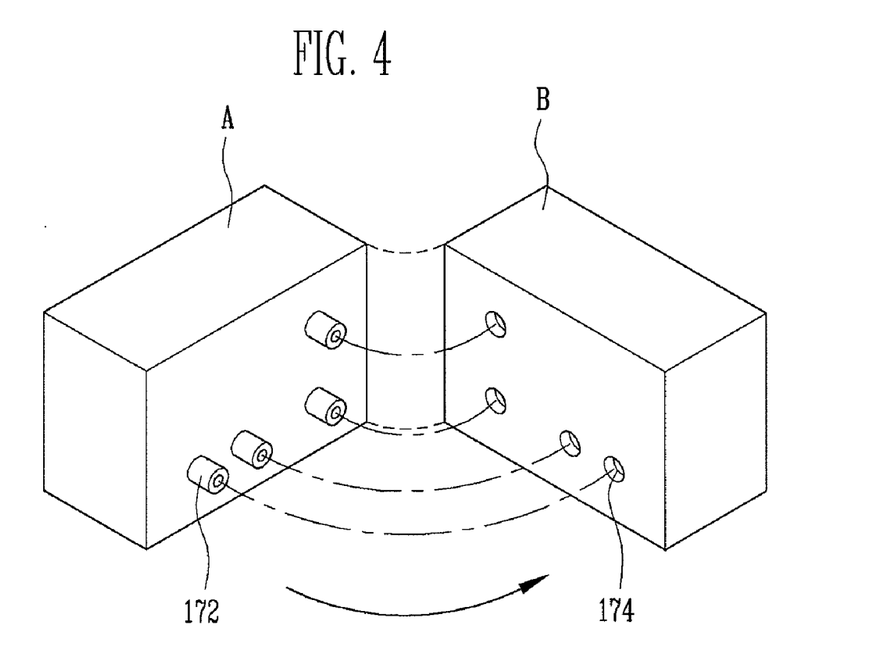
FIG. 4 is a perspective view illustrating an embodiment of mating stems and ports formed in adjacent modules.

The connection ports may be fluidly connected, for example, by shrink fitting a coupling into a corresponding socket, as shown in FIG. 4. That is to say, couplings 172 are provided in each of connection ports of a first module (A), and sockets 174 corresponding to the couplings 172 are provided in each of connection ports of a second module (B) adjacent to the first module (A). The protrusion 172 is shrink fit into the socket 174, thereby forming a hermetic connection between corresponding connection ports.

To maintain a seal between corresponding connection ports, an O-ring or gasket may be provided between sealing portions of corresponding connection ports, for example, between the surfaces of adjacent housings of the adjacent modules (A, B).

Also, in order to maintain a surface-to-surface contact between adjacent modules (A, B), a shrink fit coupling (not shown) and its corresponding fit socket (not shown) may be provided in each of the housings of adjacent modules. That is to say, surface-to-surface contact between adjacent modules (A, B) may be maintained by shrink fitting the shrink fit coupling into the fit socket. However, the positions of adjacent modules (A, B) may also be maintained by shrink fitting of a coupling 172 into a socket 174, as discussed above, instead of shrink fitting of a shrink fit coupling into a fit socket.

Each of the coupling 172 and/or shrink fit coupling and the socket 174 and/or fit socket may be integrally formed in each of the housings of the modules (A, B), or may be provided as separate members that are shrink fit into a connection port.

As described above, a fuel cell system may be easily and swiftly manufactured by assembling and connecting previously assembled modules in a surface-to-surface contact manner.

Hereinafter, an operation of the module-type fuel cell system assembled according to the above-mentioned assembly process will be described in detail with reference to the embodiments illustrated in FIG. 1 through FIG. 3.

First, a hydrogen-containing fuel having a predetermined concentration is pumped to the anode electrode of the generator of the power module 160 through the fuel flow tube 152-1 by the first fuel pump 126a and the second fuel pump 126b. And, an oxidizing agent flows to the cathode electrode of the generator of the power module 160 from the oxidizing agent supply module 130 through the oxidizing agent flow tube 152-2.

If the hydrogen-containing fuel is methanol and the oxidizing agent is oxygen, the following electrochemical reactions occur at the anode electrode and the cathode electrode of the generator.

$$\text{Anode Reaction:} \quad CH_3OH + H_2O \rightarrow CO_2 + 6H^+ + 6e^-$$

$$\text{Cathode Reaction:} \quad \frac{3}{2}O_2 + 6H^+ + 6e^- \rightarrow 3H_2O$$

$$\text{Total Reaction:} \quad CH_3OH + \frac{3}{2}O_2 \rightarrow 2H_2O + CO_2$$

That is to say, one carbon dioxide, six hydrogen ions, and six electrons are generated by the reaction of methanol and water at the anode electrode (Oxidation Reaction). The generated hydrogen ions are transferred to the cathode electrode through a polymer membrane, for example, the hydrogen-ion exchange membrane of the generator. Oxygen reacts with hydrogen ions and electrons, transferred through an external circuit, to generate water at the cathode electrode (Reduction Reaction). In total, oxygen reacts with methanol to generate water and carbon dioxide, and also to generate electricity. The generated electricity reaches the external circuit through a current collector.

Any unreacted fuel that does not take part in the above-mentioned chemical reaction flows into the storage space of the recovery housing 152 through the unreacted fuel outlet 162b of the power housing 162, and the unreacted fuel inlet 152b of the recovery housing 152. And, water vapor flows into the heat exchanger installed inside the heat exchange housing 142 through the vapor flow tube 152-3 of the recovery module 150, and then condenses into liquid water through a heat exchange process. Then, the generated water is collected in the storage space of the recovery housing 152 through the water outlet 142a of the heat exchange housing 142 and the water inlet 152c of the recovery housing 152, where it is mixed with unreacted fuel.

The mixture of unreacted fuel and water flows from the storage space of the recovery housing 152 through the unreacted fuel outlet 152a into the mixing tank 124 where it is mixed with a hydrogen-containing fuel supplied from the fuel storage housing 112 in the mixing tank 124 of the fuel supply housing 122.

In order to discharge the carbon dioxide generated by the above-mentioned chemical reaction, a gas-liquid separator 154 may be provided at the top of the recovery module 150. That is to say, the carbon dioxide generated in the anode electrode flows into the recovery housing 152 together with unreacted fuel, and then is discharged into the atmosphere through the gas-liquid separator 154. Also, in order to discharge any water vapor that is not completely condensed in the heat exchanger of the heat exchange module 140, a gas-liquid separator 144 may be provided at the top of the heat exchange housing 142. A gas-liquid separator may also be provided at the top of the power housing 162. The above-mentioned gas-liquid separators may be manufactured integrally with the modules. The gas-liquid separators may comprise ceramic and/or membrane-based materials.

According to the present invention, a finished product of the module-type fuel cell system may be simply manufactured and dead space in the system may be reduced by assembling prefabricated component modules containing the components of the fuel cell system.

The embodiments described herein are for the purpose of illustration only, and are not intended to limit the scope of the disclosure. Those skilled in the art will understand that equivalents and modifications could be made thereto without departing from the spirit and scope thereof. Therefore, it should be understood that the scope is defined in the claims and their equivalents.

What is claimed is:

1. A module-type fuel cell system comprising:
   a power module comprising a power housing, a generator installed therein, and a plurality of connection ports formed on a first side of the power housing and fluidly connected to the generator, wherein the generator is operable to generate electricity through an oxidation-reduction reaction between an oxidizing agent and a hydrogen-containing fuel;
   a fuel supply module comprising a fuel supply housing, a fuel supply unit installed therein, and a plurality of connection ports formed on a first side of the fuel supply housing and fluidly connected to the fuel supply unit, wherein the fuel supply unit is configured to supply a suitable hydrogen-containing fuel to the generator;
   an oxidizing agent supply module comprising an oxidizing agent supply housing, an oxidizing agent supply unit installed therein, and a connection port formed on a side of the oxidizing agent supply housing and fluidly connected to the oxidizing agent supply unit, wherein the oxidizing agent supply unit is configured to supply an oxidizing agent to the generator; and
   a recovery module comprising a recovery housing comprising a first side and a second side, a storage space formed therein, and a plurality of connection ports on the first and second sides of the recovery housing and fluidly connected to the storage space, wherein the storage space is configured to recover unreacted fuel from the generator and accumulate the unreacted fuel in the storage space, wherein
   the first side of the power housing contacts and is secured to the first side of the recovery housing-, and the side of the fuel supply housing and the side of the oxidizing agent supply housing contact and are secured to the second side of the recovery module, and
   corresponding connection ports of adjacent modules align and form fluid connections therebetween and wherein tubes, including a fuel flow tube connecting the fuel supply module and the power module, extend through the storage space of the recovery module interconnecting the power housing and the fuel supply module and the oxidizing agent supply module to separate the fuel and the oxidizing agent from the recovered unreacted fuel.

2. The module-type fuel cell system according to claim 1, further comprising a heat exchange module comprising a heat exchange housing, a heat exchange unit therein, and a plurality of connection ports formed on a side of the heat exchange housing and fluidly connected to the heat exchange unit, wherein the heat exchange unit is operable to condense water vapor discharged from the power module.

3. The module-type fuel cell system according to claim 2, wherein the side of the heat exchange module contacts and is secured to the second side of the recovery module.

4. The module-type fuel cell system according to claim 3, further comprising a fuel storage module comprising a fuel storage housing configured for storing a hydrogen-containing fuel therein, and a connection port formed on a side of the fuel storage housing fluidly connected to a corresponding connection port on a side of the fuel supply module.

5. The module-type fuel cell system according to claim 4, wherein the side of the fuel storage housing contacts and is secured to a side of the fuel supply housing.

6. The module-type fuel cell system according to claim 5, wherein the corresponding connection ports of adjacent modules are hermetically connected.

7. The module-type fuel cell system according to claim 6, wherein a coupling is provided on each the connection port of the housing of a first module, and a socket dimensioned for connecting to the coupling is provided in each the connection port of the housing of a second, adjacent module.

8. The module-type fuel cell system according to claim 7, wherein the couplings and the sockets are shrink fit connectors and are coupled together.

9. The module-type fuel cell system according to claim 8, wherein the couplings and the sockets are integrally formed on each of the corresponding connection ports.

10. The module-type fuel cell system according to claim 6, wherein a shrink fit coupling is provided on the housing of a first module, and a fit socket corresponding to the shrink fit coupling is provided on the housing of a second, adjacent module.

11. The module-type fuel cell system according to claim 10, wherein the shrink fit coupling is coupled to the fit socket, thereby maintaining contact between the adjacent modules.

12. The module-type fuel cell system according to claim 1, wherein the assembled fuel supply module, recovery module, and power module form a fuel supply line comprising the fuel flow tube, a connection ports of the fuel supply module, and a connection port of the power module, wherein the fuel supply line fluidly connects the fuel supply module to the power module.

13. The module-type fuel cell system according to claim 12, wherein a connection port on the power housing of the power module is an unreacted fuel outlet configured for discharging unreacted fuel from the generator, and a corresponding connection port on the recovery housing of the recovery module is an unreacted fuel inlet.

14. The module-type fuel cell system according to claim 13, wherein
a first connection port formed on a second side of the fuel supply housing of the fuel supply module is a fuel inlet configured for allowing inflow of a hydrogen-containing fuel, and a second connection port formed on the first side of the fuel supply housing is a fuel outlet corresponding to the fuel inlet of the recovery housing,
the fuel outlet is configured for discharging a hydrogen-containing fuel, and
the fuel supply housing comprises a fuel pump installed therein, fluidly connecting the fuel outlet with the fuel inlet.

15. The module-type fuel cell system according to claim 14, further comprising an oxidizing agent flow tube installed within and traversing the storage space of the recovery housing, the oxidizing agent flow tube fluidly connecting the power module with the oxidizing agent supply module.

16. The module-type fuel cell system according to claim 15, wherein the assembled oxidizing agent supply module, recovery module, and power module form an oxidizing agent supply line comprising the oxidizing agent flow tube, a connection port of the oxidizing agent supply module, and a connection port of the power module, wherein the oxidizing agent supply line fluidly connects the oxidizing agent supply module to the power module.

17. The module-type fuel cell system according to claim 16, further comprising a vapor flow tube installed within and traversing the storage space of the recovery module, fluidly connecting the heat exchange module with the power module.

18. The module-type fuel cell system according to claim 17, wherein the assembled power module, recovery module, and heat exchange module form a vapor supply line comprising the vapor flow tube, a connection port of the power module, and a connection port of the heat exchange module, wherein the vapor supply line fluidly connects the power module to the heat exchange module.

19. The module-type fuel cell system according to claim 18, wherein a connection port on a side of the heat exchange housing is a water outlet for water condensed in the heat exchange unit, and corresponding connection port on the second side of the recovery housing is a water inlet.

20. The module-type fuel cell system according to claim 19, wherein a connection port on the second side of the recovery housing is an unreacted fuel outlet for unreacted fuel, and a corresponding connection port on the first side of the fuel supply housing is an unreacted fuel inlet.

21. The module-type fuel cell system according to claim 20, wherein the fuel supply module further comprises a mixing tank fluidly connected to the unreacted fuel inlet and the fuel inlet installed therein, configured for mixing an unreacted fuel from the unreacted fuel inlet with a hydrogen-containing fuel from the fuel inlet.

22. The module-type fuel cell system according to claim 21, wherein the fuel supply unit further comprises an inlet fuel pump fluidly connected to the mixing tank and an outlet pump fluidly connected to the mixing tank.

23. The module-type fuel cell system according to claim 22, wherein a gas-liquid separator is provided at the top of the recovery module.

24. The module-type fuel cell system according to claim 23, wherein a gas-liquid separator is provided at the top of the heat exchange module.

25. The module-type fuel cell system according to claim 1, wherein the fuel flow tube in the recovery module fluidly connects a fuel inlet connection port and a fuel outlet connection port.

26. The module-type fuel cell system according to claim 25, wherein a connection port in the power housing is a fuel inlet corresponding to the fuel outlet of the recovery housing.

27. The module-type fuel cell system according to claim 26, wherein the fuel inlet of the power housing is fluidly connected to an anode electrode of the generator.

28. The module-type fuel cell system according to claim 14, wherein the connection port on the fuel storage housing is a fuel outlet corresponding to the fuel inlet of the fuel supply housing.

29. The module-type fuel cell system according to claim 15, wherein the oxidizing agent flow tube in the recovery module fluidly connects an oxidizing agent inlet connection port and an oxidizing agent outlet connection port.

30. The module-type fuel cell system according to claim 29, wherein a connection port on the power housing is an oxidizing agent inlet corresponding to the oxidizing agent outlet of the recovery housing.

31. The module-type fuel cell system according to claim 30, wherein the oxidizing agent inlet of the power housing is fluidly connected to a cathode electrode of the generator.

32. The module-type fuel cell system according to claim 29, wherein the connection port of the oxidizing agent supply housing is an oxidizing agent outlet corresponding to the oxidizing agent inlet of the recovery housing.

33. The module-type fuel cell system according to claim 17, wherein the vapor flow tube of the recovery module fluidly connect a vapor inlet connection port and a vapor outlet connection port.

34. The module-type fuel cell system according to claim 33, wherein a connection port on the power housing is a vapor outlet corresponding to the vapor inlet of the recovery module, and a connection port on the heat exchange housing is a vapor inlet corresponding to the vapor outlet of the recovery module.

* * * * *